(12) United States Patent
Hitz et al.

(10) Patent No.: US 6,857,001 B2
(45) Date of Patent: Feb. 15, 2005

(54) MULTIPLE CONCURRENT ACTIVE FILE SYSTEMS

(75) Inventors: David Hitz, Los Altos, CA (US); John Edwards, Sunnyvale, CA (US); Blake Lewis, Los Altos Hills, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 112 days.

(21) Appl. No.: 10/165,188

(22) Filed: Jun. 7, 2002

(65) Prior Publication Data

US 2003/0229656 A1 Dec. 11, 2003

(51) Int. Cl.⁷ .............................................. G06F 17/30
(52) U.S. Cl. ....................... 707/202; 707/100; 707/201; 707/1; 707/8
(58) Field of Search .......................... 707/1, 100, 201, 707/202, 8, 200, 2

(56) References Cited

U.S. PATENT DOCUMENTS

| | | | |
|---|---|---|---|
| 4,742,450 A | 5/1988 | Duvall et al. ................ | 709/310 |
| 4,825,354 A | 4/1989 | Agrawal et al. .............. | 707/10 |
| 4,875,159 A | 10/1989 | Cary et al. ................... | 707/203 |
| 5,014,192 A * | 5/1991 | Mansfield et al. ............. | 707/1 |
| 5,043,871 A | 8/1991 | Nishigaki et al. ............ | 707/202 |
| 5,144,659 A | 9/1992 | Jones .......................... | 713/165 |
| 5,163,148 A | 11/1992 | Walls .......................... | 707/204 |
| 5,182,805 A | 1/1993 | Campbell .................... | 711/163 |
| 5,195,100 A | 3/1993 | Katz et al. .................... | 714/22 |
| 5,208,813 A | 5/1993 | Stallmo ........................ | 714/7 |

(List continued on next page.)

FOREIGN PATENT DOCUMENTS

| | | |
|---|---|---|
| EP | 1197836 A2 | 4/2002 |
| WO | WO 89/03086 A1 | 4/1989 |
| WO | WO 91/13404 A1 | 9/1991 |
| WO | WO 94/29795 A1 | 12/1994 |
| WO | WO 94/29796 A1 | 12/1994 |
| WO | WO 94/29807 A1 | 12/1994 |
| WO | WO 99/45456 A1 | 9/1999 |
| WO | WO 99/46680 A1 | 9/1999 |
| WO | WO 99/66401 A1 | 12/1999 |
| WO | WO 00/07104 A1 | 2/2000 |
| WO | WO 00/11553 A1 | 3/2000 |
| WO | WO 01/14991 A3 | 3/2001 |
| WO | WO 01/14991 A2 | 3/2001 |
| WO | WO 01/31446 A1 | 5/2001 |
| WO | WO 01/43368 A1 | 6/2001 |
| WO | WO 02/17057 A2 | 2/2002 |
| WO | WO 02/29572 A2 | 4/2002 |
| WO | WO 02/29573 A2 | 4/2002 |
| WO | WO 02/029573 A3 | 4/2002 |

OTHER PUBLICATIONS

Steve Bobrowski. "Protecting Your Data: Overview and Comparison of Backup and Recovery Features in Database Servers". Jul., 1993.

(List continued on next page.)

*Primary Examiner*—Greta Robinson
*Assistant Examiner*—Cheryl Lewis
(74) *Attorney, Agent, or Firm*—Swernofsky Law Group PC

(57) ABSTRACT

Maintenance of plural active file systems, wherein each of the active file systems initially access data shared with another of the active file systems, and wherein changes made to each of the active file systems are not reflected in other active file systems. When a second active file system is created based on a first active file system, the first active file system and the second active file system initially share data. When changes are made to the first active file system, modified data is recorded in the first active file system in a location that is not shared with the second active file system. When changes are made to the second active file system, modified data is recorded in the second active file system in a location that is not shared with the first active file system. Also, creation of the plural active file systems.

63 Claims, 6 Drawing Sheets

U.S. PATENT DOCUMENTS

| | | | | |
|---|---|---|---|---|
| 5,255,270 | A | | 10/1993 | Yanai et al. .................. 714/710 |
| 5,278,838 | A | | 1/1994 | Ng et al. ......................... 714/6 |
| 5,315,602 | A | | 5/1994 | Noya et al. .................. 714/766 |
| 5,357,509 | A | | 10/1994 | Ohizumi ......................... 714/7 |
| 5,379,417 | A | | 1/1995 | Lui et al. ...................... 713/300 |
| 5,390,187 | A | | 2/1995 | Stallmo .......................... 714/7 |
| 5,392,446 | A | | 2/1995 | Tower et al. ................... 712/11 |
| 5,398,253 | A | | 3/1995 | Gordon ....................... 714/766 |
| 5,452,444 | A | | 9/1995 | Solomon et al. ................ 714/6 |
| 5,490,248 | A | | 2/1996 | Dan et al. ........................ 714/6 |
| 5,566,297 | A | | 10/1996 | Devarakonda et al. ......... 714/15 |
| 5,604,862 | A | * | 2/1997 | Midgely et al. ................. 714/6 |
| 5,633,999 | A | * | 5/1997 | Clowes et al. .................. 714/6 |
| 5,649,152 | A | | 7/1997 | Ohran et al. .................. 711/114 |
| 5,828,876 | A | | 10/1998 | Fish et al. ....................... 707/1 |
| 5,835,953 | A | | 11/1998 | Ohran ......................... 711/162 |
| 5,870,764 | A | | 2/1999 | Lo et al. ....................... 707/203 |
| 5,963,962 | A | | 10/1999 | Hitz et al. .................... 707/202 |
| 6,006,227 | A | | 12/1999 | Freeman et al. ................. 707/7 |
| 6,067,541 | A | | 5/2000 | Raju et al. ....................... 707/3 |
| 6,101,507 | A | | 8/2000 | Cane et al. .................. 707/204 |
| 6,101,585 | A | | 8/2000 | Brown et al. ................ 711/162 |
| 6,205,450 | B1 | | 3/2001 | Kanome ..................... 707/203 |
| 6,289,356 | B1 | | 9/2001 | Hitz et al. .................... 707/201 |
| 6,317,844 | B1 | | 11/2001 | Kleiman ......................... 714/6 |
| 6,604,118 | B2 | * | 8/2003 | Kleiman et al. ............ 707/203 |
| 6,636,878 | B1 | * | 10/2003 | Rudoff ....................... 707/204 |
| 2001/0044807 | A1 | | 11/2001 | Kleiman et al. ............ 707/203 |
| 2002/0007470 | A1 | | 1/2002 | Kleiman ......................... 714/6 |
| 2002/0019874 | A1 | | 2/2002 | Borr ........................... 709/229 |
| 2002/0019936 | A1 | | 2/2002 | Hitz et al. .................... 713/165 |
| 2002/0049718 | A1 | | 4/2002 | Kleiman et al. ................ 707/1 |
| 2002/0059172 | A1 | | 5/2002 | Muhlestein ..................... 707/1 |
| 2002/0083037 | A1 | | 6/2002 | Lewis et al. .................... 707/1 |
| 2002/0091670 | A1 | | 7/2002 | Hitz et al. ....................... 707/1 |

OTHER PUBLICATIONS

"Migrated Data Backup Utility". Jun., 1994. IBM Technical Disclosure Bulletin, pp. 505–508.

B. Srinivasan and H. Gunasingham. "Recoverable File System for Microprocessor Systems". May, 1985, pp. 179–183. XP 002031805.

* cited by examiner

MULTIPLE CONCURRENT ACTIVE FILE SYSTEMS

BACKGROUND OF THE INVENTION

1. Field of the Invention

This invention relates to multiple concurrent writeable file systems.

2. Description of the Related Art

A file system provides a structure for storing information, for example application programs, file system information, other data, etc. (hereinafter collectively referred to as simply data) on storage devices such as disk drives, CD-ROM drives, etc. One problem with many file systems is that if the file system is damaged somehow, a large quantity of data can be lost.

In order to prevent such loss of data, backups are often created of a file system. One very efficient method for creaking a backup of a file system is to create a snapshot of the file system. A snapshot is an image of the file system at a consistency point, a point at which the file system is self-consistent. A file system is self-consistent if the data stored therein constitutes a valid file system image.

In some file systems, for example Write Anywhere File system Layout (WAFL) file systems, a snapshot of a file system can be created by copying information regarding the organization of data in the file system. Then, as long as the data itself is preserved on the storage device, the data can be accessed through the snapshot. A mechanism is provided in these file systems for preserving this data, for example through a block map.

Conventionally, snapshots are read-only. A read-only snapshot can be used to recall previous versions of data and to repair damage to a file system. These capabilities can be extremely useful. However, these types of snapshots do not provide certain other capabilities that might be useful.

SUMMARY OF THE INVENTION

It would be advantageous if snapshots could be written to as well, so that a user desiring to modify a snapshot could do so. This would have several advantages:

- It would become possible to correct an erroneous entry that had been memorialized in a snapshot.
- It would become possible to delete material that was desired to be purged from the file system.
- It would become possible to make changes to an "experimental" version of the file system (or on data maintained by the file system). An "experimental" version of the file system would be a version of the file system for which catastrophic errors would not cause loss of data in a "real" active version of the file system.
- It would become possible to reverse erroneous upgrades to operation of the file system, or to operation of some programs or databases operating under the aegis of that file system.

A writable snapshot is actually another active file system. Because this active file system is based on data from another active file system, experimental modifications and changes for the active file system can be made to the writable snapshot without risking harm to the original active file system. In addition, because a snapshot can be created by simply copying organizational information and preserving existing data, writable snapshots (i.e., new active file systems) can be created easily and with utilization of few system resources.

These advantages and others are provided in an embodiment of the invention, described herein, in which plural active file systems are maintained, wherein each of the active file systems initially access data shared with another of the active file systems, and wherein changes made to each of the active file systems are not reflected in other active file systems.

In the preferred embodiment, when a second active file system is created based on a first active file system, the first active file system and the second active file system initially share data. When changes are made to the first active file system, modified data is recorded in the first active file system in a location that is not shared with the second active file system. When changes are made to the second active file system, modified data is recorded in the second active file system in a location that is not shared with the first active file system.

Further snapshots preferably are made of ones of the plural active file systems, each snapshot forming an image of its respective active file system at a past consistency point. Each snapshot includes a complete hierarchy for file system data, separate and apart from active file system data for the plural active file systems. One of these snapshots in turn can be converted into a new active file system by making the snapshot writable and by severing snapshot pointers from any of the active file systems to the new active file system.

The invention also encompasses memories that include instructions for performing the foregoing operations and storage systems that implement those operations.

This brief summary has been provided so that the nature of the invention may be understood quickly. A more complete understanding of the invention may be obtained by reference to the following description of the preferred embodiments thereof in connection with the attached drawings.

DESCRIPTION OF THE PREFERRED EMBODIMENT

Related Applications

Figure 1:
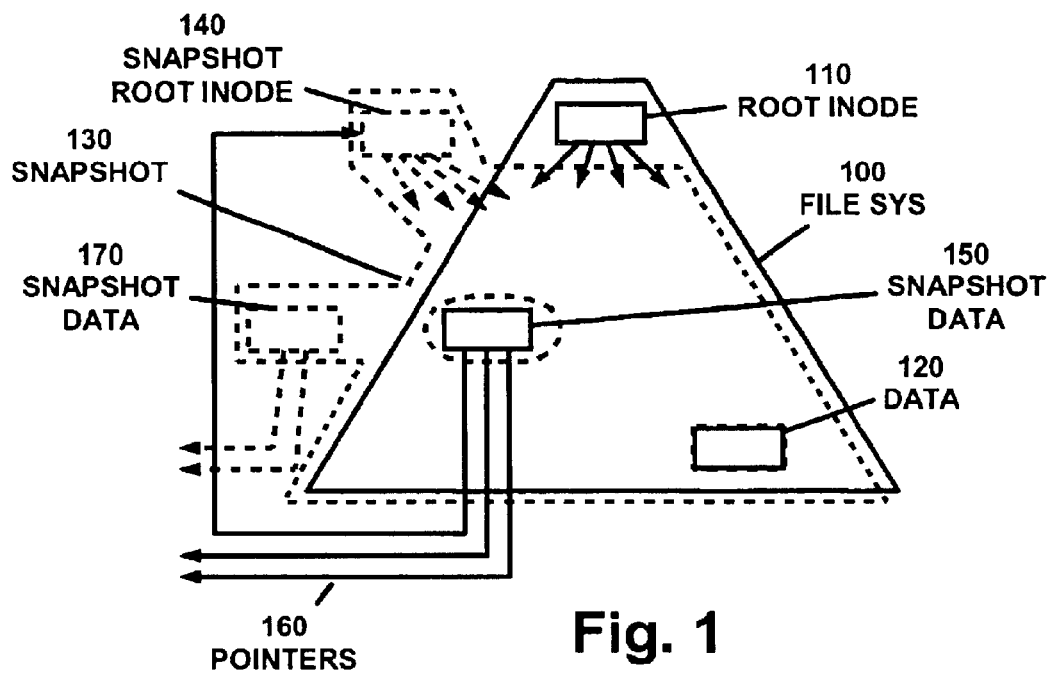
FIG. 1 illustrates creation of a snapshot that can be converted into an active file system according to the invention.

Inventions described herein can be used in conjunction with inventions described in the following documents:

- U.S. patent application Ser. No. 09/642,061, filed Aug. 18, 2000, in the name of inventors Lewis, Edwards and Viswanathan, attorney docket number 103.1035.01, titled "Instant Snapshot."
- U.S. patent application Ser. No. 09/932,578, filed Aug. 17, 2001, in the name of inventors Lewis, Edwards and Viswanathan, attorney docket number 103.1072.01, titled "Instant Snapshot."
- U.S. patent application Ser. No. 08/071,643, filed Jun. 3, 1993, in the name of inventors Hitz, Malcolm, Lau and Rakitzis, attorney docket number 103.1002.01, titled "Write Anywhere File-System Layout," now abandoned.
- U.S. patent application Ser. No. 08/454,921, filed May 31, 1995, in the name of inventors Hitz, Malcolm, Lau and Rakitzis, attorney docket number 103.1002.05, titled "Write Anywhere File-System Layout," now U.S. Pat. No. 5,819,292.
- U.S. patent application Ser. No. 09/108,022, filed Jun. 30, 1998, in the name of inventors Hitz, Malcolm, Lau and Rakitzis, attorney docket number 103.1002.07, titled "Write Anywhere File-System Layout," now U.S. Pat. No. 5,963,962.
- U.S. patent application Ser. No. 09/153,094, filed Sep. 14, 1998, in the name of inventors Hitz, Malcolm, Lau and Rakitzis, attorney docket number 103.1002.08, titled "Write Anywhere File-System Layout," now U.S. Pat. No. 6,289,356 B1.
- U.S. patent application Ser. No. 09/954,522, now U.S. Pat. No. 6,721,764, filed Sep. 11, 2001, in the name of inventors Hitz, Malcolm, Lau and Rakitzis, attorney docket number 103.1002.12, titled "Write Anywhere File-System Layout."
- U.S. patent application Ser. No. 09/642,065, now U.S. Pat. No. 6,636,879, filed Aug. 18, 2000, in the name of inventors Doucette, Lewis and Edwards, attorney docket number 103.1045.01, titled "Improved Space Allocation in a Write Anywhere File System."

These documents are hereby incorporated by reference as if fully set forth herein. These documents are referred to as the "incorporated disclosures".

Lexicography

The following terms refer or relate to aspects of the invention as described below. The descriptions of general meanings of these terms are not intended to be limiting, only illustrative.

- data—In general, any information. With regard to a storage device or file system, any information stored in the storage device or file system, including but not limited to application programs and data, multimedia data, organizational data for the storage device or file system, etc.
- organizational data—In general, data that specifies the layout of other data in a file system. In a Write Anywhere File system Layout (WAFL) design, the organizational data includes a root inode that points either directly or indirectly (i.e., through other inodes) to blocks of data for all files in the file system. In a WAFL design, all data including the organizational data (and thus root inode and other inodes) are stored in blocks.
- inode—In general, an information node. In a WAFL design, an information node that contains data about other blocks in the file system.
- self-consistent (in the context of a file system)—In general, a file system is self-consistent when the data stored in the file system, including data about the organization of the file system, constitutes a valid file system image.
- consistency point—In general, a consistency point refers either to (a) a time when a file system is self-consistent; or to (b) a set of data in a file system at a time of a consistency point.
- snapshot—In general, a snapshot is a written record of the data maintained by the file system at a time of a consistency point. Although in a preferred embodiment, each snapshot is both (a) maintained in a format similar to the active file system and (b) is referenceable using the file system namespace, there is no particular limitation of the invention to require either of those conditions.
- active file system—In general, an active file system is a set of data that can be accessed and modified.
- file system hierarchy—In general, a file system hierarchy refers to either (a) an organization of data into a namespace, or (b) a set of data blocks and their interconnections used to record and access information, whether data or metadata, being maintained on a storage device.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

Snapshots and Active File Systems

FIG. 1 illustrates creation of a snapshot that can be converted into an active file system according to the invention.

File system 100 in FIG. 1 resides on one or more storage devices, for example hard disk drives, CD-ROMs, or other devices. In a preferred embodiment, file system 100 is a WAFL system, although this does not have to be the case. WAFL file systems are described in detail in the incorporated disclosures.

File system 100 includes root inode 110 and data 120, as well as other data. All of the inodes and data in file system 100 preferably are stored in blocks, although this also does not have to be the case.

Root inode 110 stores parts of the organizational data for file system 100. In particular, root inode 110 points to data and to other inodes and data that in turn point to data for all information stored in file system 100. Thus, any information stored in a file system 100 can be reached by starting at root inode 110.

Snapshot 130 has been formed from file system 100. In FIG. 1, elements of snapshot 130 are shown using dashed lines to assist in distinguishing those elements from file system 100. According to a preferred embodiment of the invention, the snapshot can be formed by simply copying root inode 110 to snapshot root inode 140 at a consistency point for file system 100. In some embodiments, additional organizational data may have to be copied. Then, as long as all of the data and inodes pointed to by root inode 10 (and any other copied organizational data) are preserved, snapshot root inode 140 will point to a valid copy of file system 100.

After snapshot root inode 140 has been created, snapshot 130 and file system 100 actually share data on the storage device or devices. Thus, snapshot 130 preferably includes the same physical data 120 on the storage device or devices as file system 100, as indicated by the duel solid and dashed borders around data 120 in FIG. 1. In other words, the snapshot and the file system overlap. This allows for rapid creation of snapshot 130 with efficient use of storage space and other system resources.

File system 100 preferably includes snapshot data 150 that points to snapshots of file system 100. In particular, pointers 160 in the snapshot data preferably point to root inodes of those snapshots.

Snapshot 130 also preferably includes snapshot data 170 that points to other snapshots. However, snapshot data 170 of snapshot 130 can be different from snapshot data 150 of file system 100 because snapshot 130 preferably does not point to itself. This difference is shown in FIG. 1 by the cutout of snapshot 130 around snapshot data 150 in file system 100.

Preferably, a snapshot of a file system according to the invention includes a complete hierarchy for file system data, separate and apart from active file system data for the active file systems. This hierarchy is included in the root inode for the snapshot and possibly in other nodes and data copied for the snapshot (not shown).

There is no particular requirement for the file system hierarchies for a snapshot to duplicate the name space originally used for the associated active file system. In one preferred embodiment, file names in a snapshot's root inode (and other organizational data) can be compressed using a hash code or other technique, so as to minimize the organizational data that must be stored for each snapshot. However, in an alternative embodiment, in some circumstances possibly preferable, it might be superior to maintain the original name space and other organizational data for each snapshot in a form relatively easy to read by a human user. This might have the salutary effect of aiding human users with backup and restore operations based on such snapshots.

Figure 2:
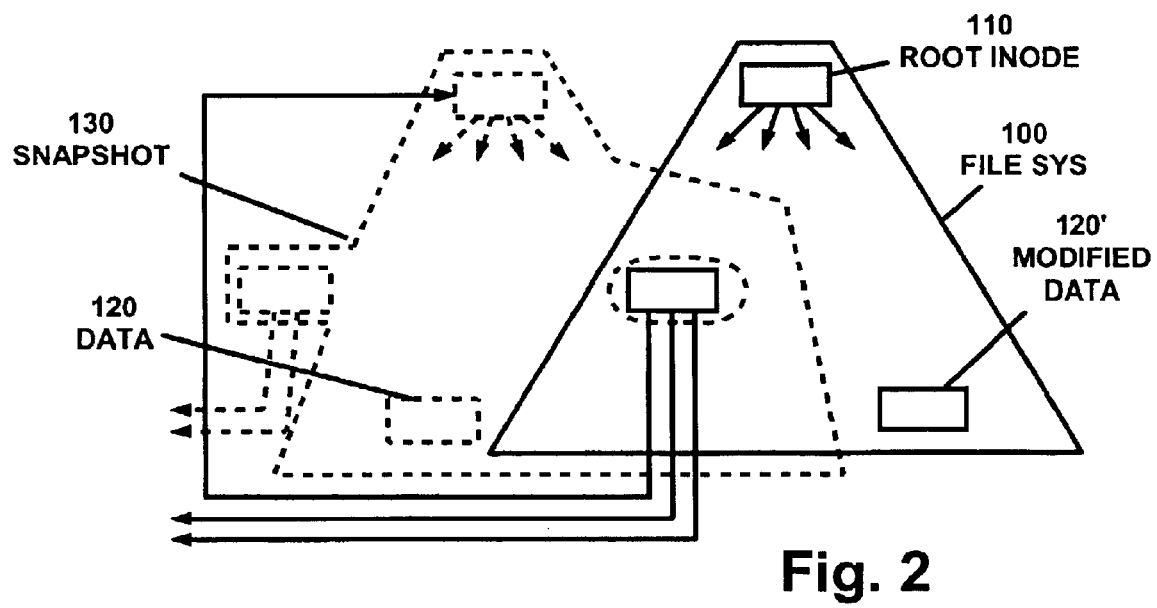
FIG. 2 illustrates divergence of an active file system from a snapshot of that file system.

FIG. 2 illustrates divergence of an active file system from a snapshot of that file system.

Because file system 100 is active, a mechanism must be provided for changing data in the file system. However, in order to maintain the integrity of snapshot 130, data pointed to by snapshot root inode 140 must be preserved. Thus, for example, when data 120 is changed in file system 100, modified data 120' is stored in the storage device or devices. Root inode 110 of file system 100 and any intervening inodes and organizational data are updated to point to modified data 120'. In addition, the unmodified data 120 is preserved on the storage device or devices. Snapshot root inode 140 continues to point to this unmodified data, thereby preserving the integrity of snapshot 130.

Likewise, when data is deleted from active file system 100, pointers to that data are removed from the file system. However, the data itself is preserved if it is included in snapshot 130. (This data can actually be deleted when the snapshot itself is removed.)

In actual practice, changes to root inode 110, other inodes, and data for many changes to file system 100 are accumulated before being written to the storage device or devices. After such changes have been written, file system 100 is self-consistent (i.e., at a consistency point). Preferably, snapshots are only made at such consistency point.

According to the invention, snapshot 130 can be converted into a new active file system by making the snapshot writable. In order to modify data in a writable snapshot 130, modified data is written to the storage device or devices. Root inode 140 and any intervening inodes and organizational data pointing to the modified data are updated. Furthermore, an unmodified copy of the data is preserved if it is still included in file system 100. This process is substantially identical to the process that occurs when modifications are made to file system 100, only the unmodified data that is preserved is data pointed to by root inode 110.

In other words, when changes are made to the first active file system (e.g., file system 100), modified data is recorded in the first active file system in a location that is not shared with the second active file system (e.g., writable snapshot 130). Likewise, when changes are made to the second active file system, modified data is recorded in the second active file system in a location that is not shared with the first active file system. As a result, changes made to the first active file system not reflected in the second active file system, and changes made to the second active file system not reflected in the first active file system.

When created, snapshot 130 substantially overlaps file system 100. If the snapshot is made writable shortly after its creation, the new active file system formed by the writable snapshot will initially share almost all of its data with the existing active file system. As a result, the invention allows for creation of an entire new active file system with efficient utilization of resources such as processing time and storage space.

The process of storing modified data and preserving unmodified data causes file system 100 and snapshot 130 (whether read-only or writable) to diverge from one another. This divergence is representationally shown in FIG. 2 by a reduction in overlap between file system 100 and snapshot 130.

Figure 3:
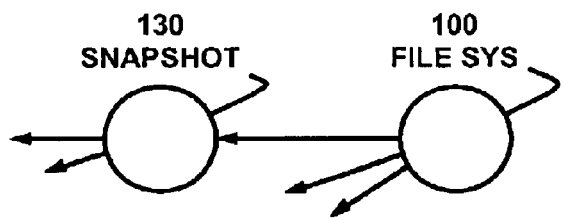
FIG. 3 illustrates the relationship between the active file system and the snapshot in FIG. 2.

FIG. 3 illustrates the relationship between the active file system and the snapshot in FIG. 2. This type of diagram provides a simplified view of the relationship between file systems and their snapshots. In FIG. 3, file system 100 points to snapshot 130. In addition, both file system 100 and snapshot 130 point to other snapshots (not shown).

Figure 4:
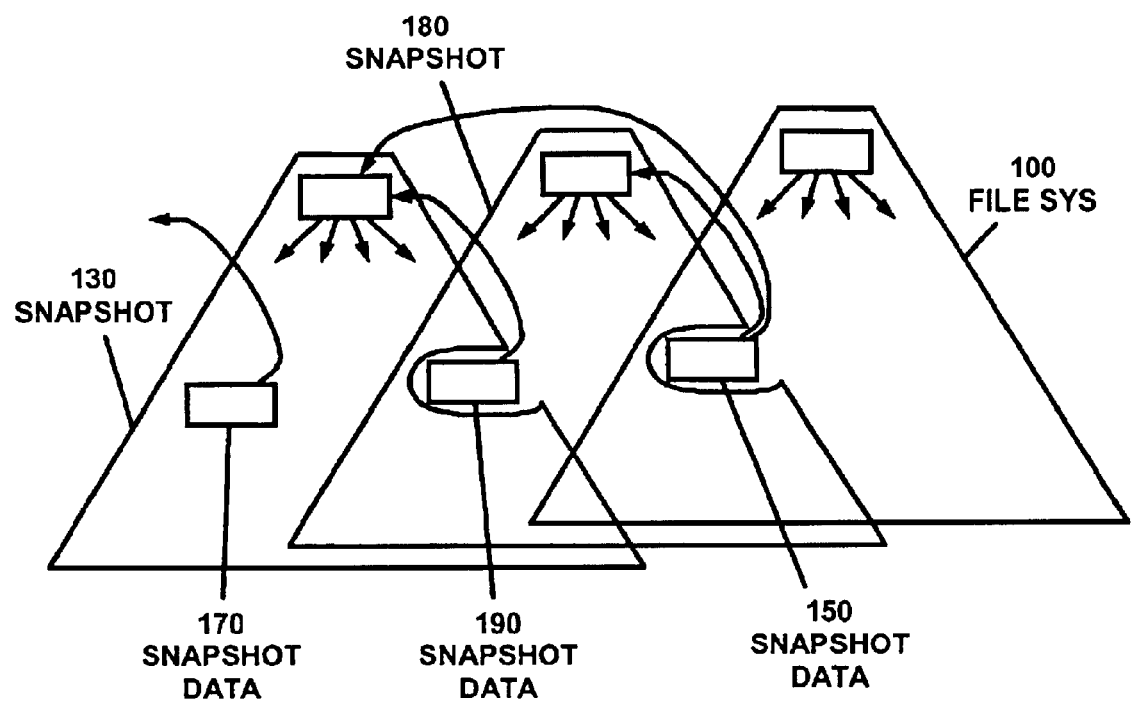
FIG. 4 illustrates a chain of snapshots that can be converted into active file systems according to the invention.

FIG. 4 illustrates a chain of snapshots that can be converted into active file systems according to the invention. In this figure, second snapshot 180 has been created from file system 100. Because snapshot 100 still pointed to snapshot 130 at the time of the creation of the second snapshot, snapshot 180 includes snapshot data 190 that points to snapshot 130.

Either or both of snapshots 130 and 180 can be turned into active file systems by making those snapshots writable. As a data is written to any of the active file systems (i.e., file system 100, writable snapshot 130, or writable snapshot 180), the file systems will diverge from one another.

Figure 5:
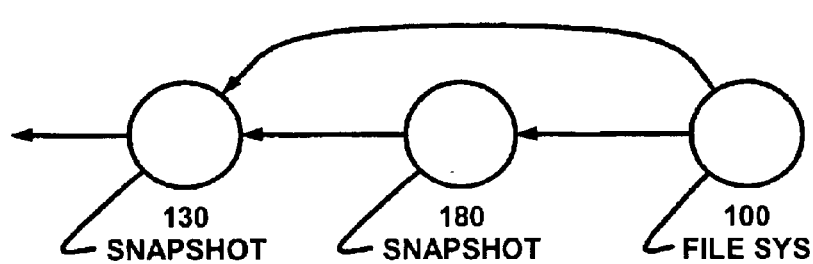
FIG. 5 illustrates the relationship between the active file system and the snapshots in FIG. 4.

FIG. 5 illustrates the relationship between the active file system and the snapshots in FIG. 4. In FIG. 5, file system 100 points to snapshots 130 and 180. Likewise, snapshot 180 points to snapshot 130, which in turn can point to another snapshot or snapshots.

Figure 6:
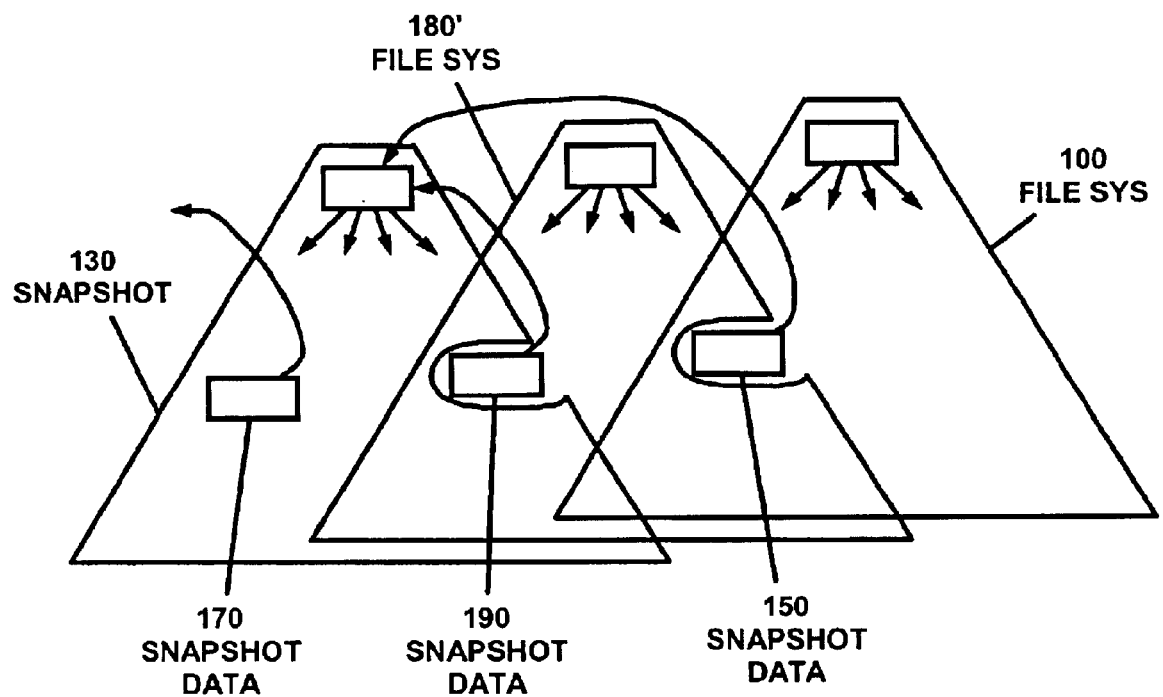
FIG. 6 illustrates a snapshot that has been converted into an active file system according to the invention.

FIG. 6 illustrates a snapshot that has been converted into an active file system according to the invention. In this figure, snapshot 180 has been turned into active file system 180' by being made writable. Because this new active file system can be modified, it no longer represents a true snapshot of file system 100. As a result, the snapshot pointer to snapshot 180 in snapshot data 150 of file system 100 has been severed, for example by being deleted.

Figure 7:
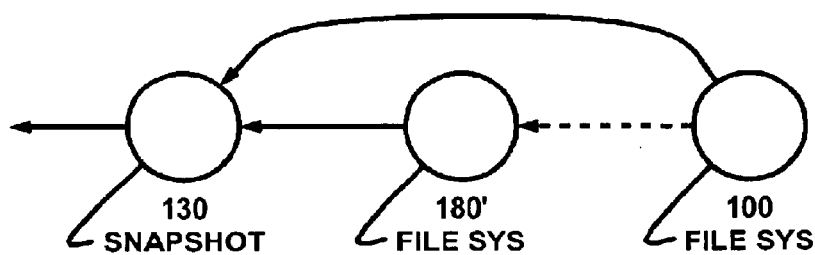
FIG. 7 illustrates the relationship between the active file system, new active file system, and snapshot in FIG. 6.

FIG. 7 illustrates the relationship between the active file system, new active file system, and snapshot in FIG. 6. In this figure, active file system 100 points to snapshot 130. Likewise, active file system 180' also points to snapshot 130. As discussed above, file system 100 preferably no longer includes a snapshot pointer to snapshot 180. However, file system 100 can still included a pointer to file system 180', for example to allow traversal from one file system to the other. This inter-file-system pointer is shown as a dashed line in FIG. 7 to distinguish it from a snapshot pointer.

Figure 8:
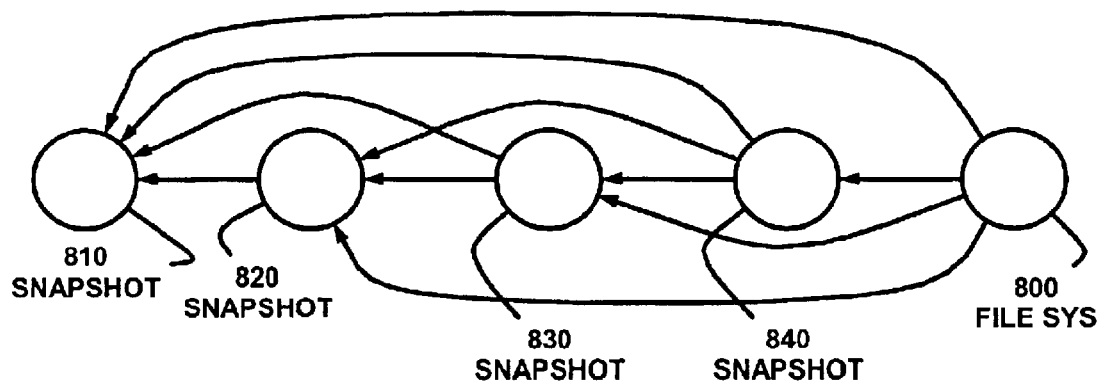
FIG. 8 illustrates a more complex chain of snapshots that can be converted into active file systems according to the invention.

FIG. 8 illustrates a more complex chain of snapshots that can be converted into active file systems according to the invention. In FIG. 8, file system 800 is an active file system. Four snapshots have been made of this file system. Snapshot 810 is the oldest, snapshot 820 is the next oldest, snapshot 830 is the next oldest after its snapshot 820, and snapshot 840 is the newest. Any snapshots older than snapshot 810 have been deleted, thereby freeing up storage space that was occupied by data that was not overlapped by any of the other snapshots or the active file system. Each of snapshots 810 to 840 can be turned into an active file system by being made writable.

Figure 9:
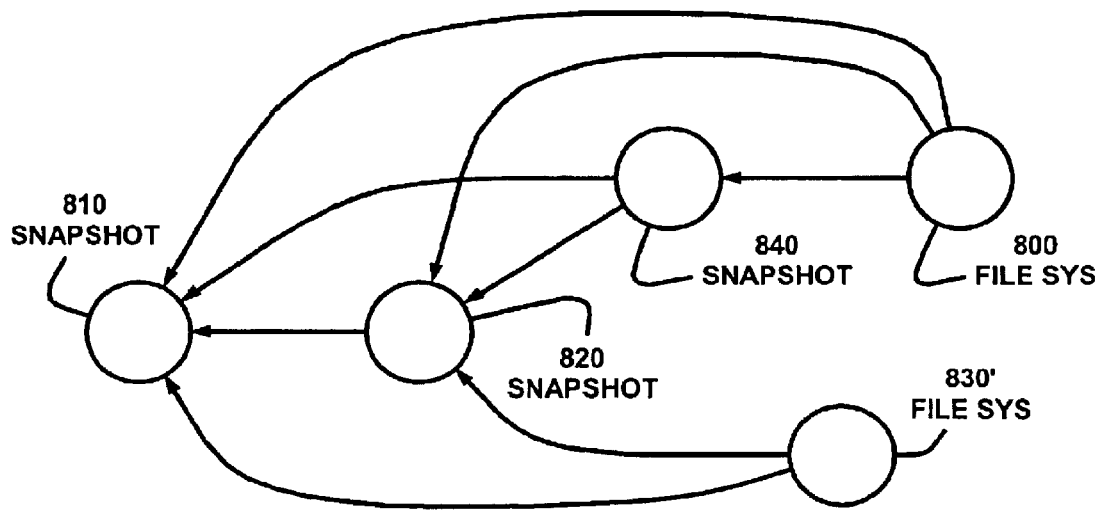
FIG. 9 illustrates the chain shown in FIG. 8 with one of the snapshots converted into an active file system according to the invention.

FIG. 9 illustrates the chain shown in FIG. 8 with one of the snapshot converted into an active file system according to the invention.

In FIG. 9, snapshot 830 has been converted into active file system 830' in which data can be modified, added, and deleted. As a result, file system 800 preferably no longer points to snapshot 830 as a snapshot. Active file system 830' can continue to point to snapshots 810 and 820.

Figure 10:
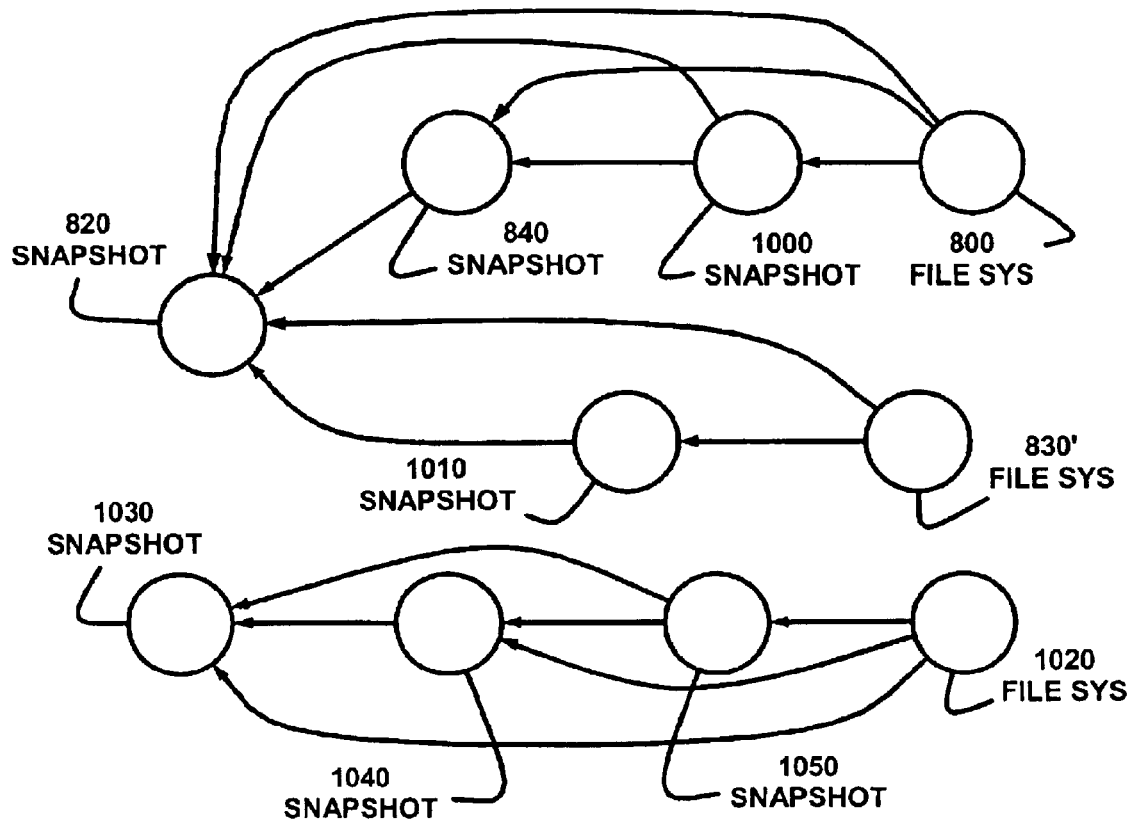
FIG. 10 illustrates some more possible relationships between plural active file systems and their associated snapshots according to the invention.

FIG. 10 illustrates some more possible relationships between plural active file systems and their associated snapshots according to the invention.

The top portion of FIG. 10 corresponds to FIG. 9, except that additional snapshots have been made from the active file systems. Thus, snapshot 1000 has been made of file system 800, and snapshot 1010 has been made of file system 830'. In addition, snapshot 810 has been deleted to free up space on the storage device or devices. Both of active file systems 800 and 830' can trace back to a common snapshot 820. However, when that snapshot is deleted, the active file systems will no longer share a common snapshot. This situation has occurred with respect to file system 1020 and snapshots 1030 to 1050. This arrangement illustrates that it is possible to have a "forest" (i.e., a collection of unconnected trees) formed by the links between active file systems and their associated snapshots, all on one storage device or set of storage devices. Despite the fact that the file systems and their snapshots no longer point to a common snapshot, these snapshots and even the active file systems could still share some data (i.e., overlap), thereby preserving the efficiency of the invention.

In the foregoing discussion, new active file systems are created from snapshots. However, the invention does not require the actual creation of a snapshot in order to create a new active file system. Rather, all that is required is creation of structures along the lines of those found in a snapshot, namely organizational data along the lines of that found in a snapshot's root inode, along with preservation of the data pointed to by that organizational data.

Furthermore, the invention is not limited to the particular arrangements discussed above. Rather, those arrangements illustrate some possible types of relationships between active file systems, snapshots, and new active file systems. Other arrangements are possible and are within the scope of the invention.

System Elements

Figure 11:
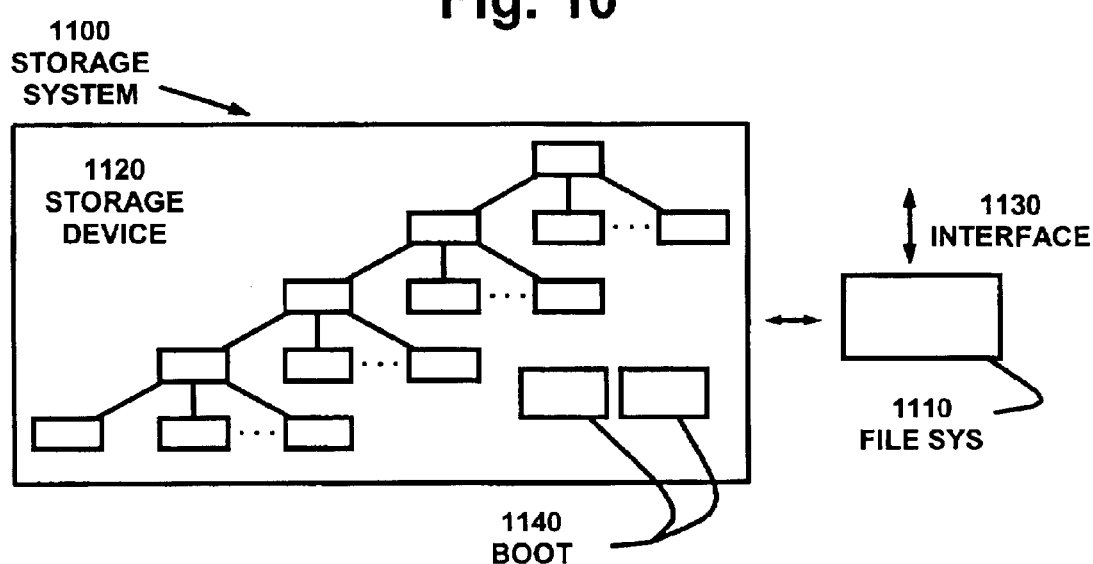
FIG. 11 shows a block diagram of a storage system including plural active file systems according to the invention.

FIG. 11 shows a block diagram of a storage system including plural active file systems according to the invention.

A system 1100 includes at least one file system processor 1110 (i.e., controller) and at least one storage device 1120 such as a hard disk or CD-ROM drive. The system also preferably includes interface 1130 to at least one computing device or network for receiving and sending information. In an alternative embodiment, processor 1100 is the processor for a computing device connected to the storage system via interface 1130.

Processor 1110 performs the tasks associated with the file system, as described herein, under control of program and data memory, the program and data memory including appropriate software for controlling processor 1110 to perform operations on storage device 1120 (and possibly for controlling storage device 1120 to cooperate with processor 1110).

In a preferred embodiment, at least one such storage device 1120 includes one or more boot records 1140. Each boot record 1140 includes two or more (preferably two) entries designating a root data block (i.e., mode) in a file system hierarchy for an active file system. Where there is a single active file system, there preferably is a single such boot record; where there is more than one such active file system, there preferably is more than one such boot record.

As noted above, more than one active file system might be present in storage device 1120. In such cases, the file system maintainer (i.e., processor 1110 operating under program control) preferably will designate and orderly maintain more than one boot record 1140, one for each such active file system.

Read-only snapshots also can be present in storage device 1120. In this case, pointers from active file systems to snapshots and from snapshots to other snapshots are stored in the storage device, as discussed above.

High Availability

Figure 12:
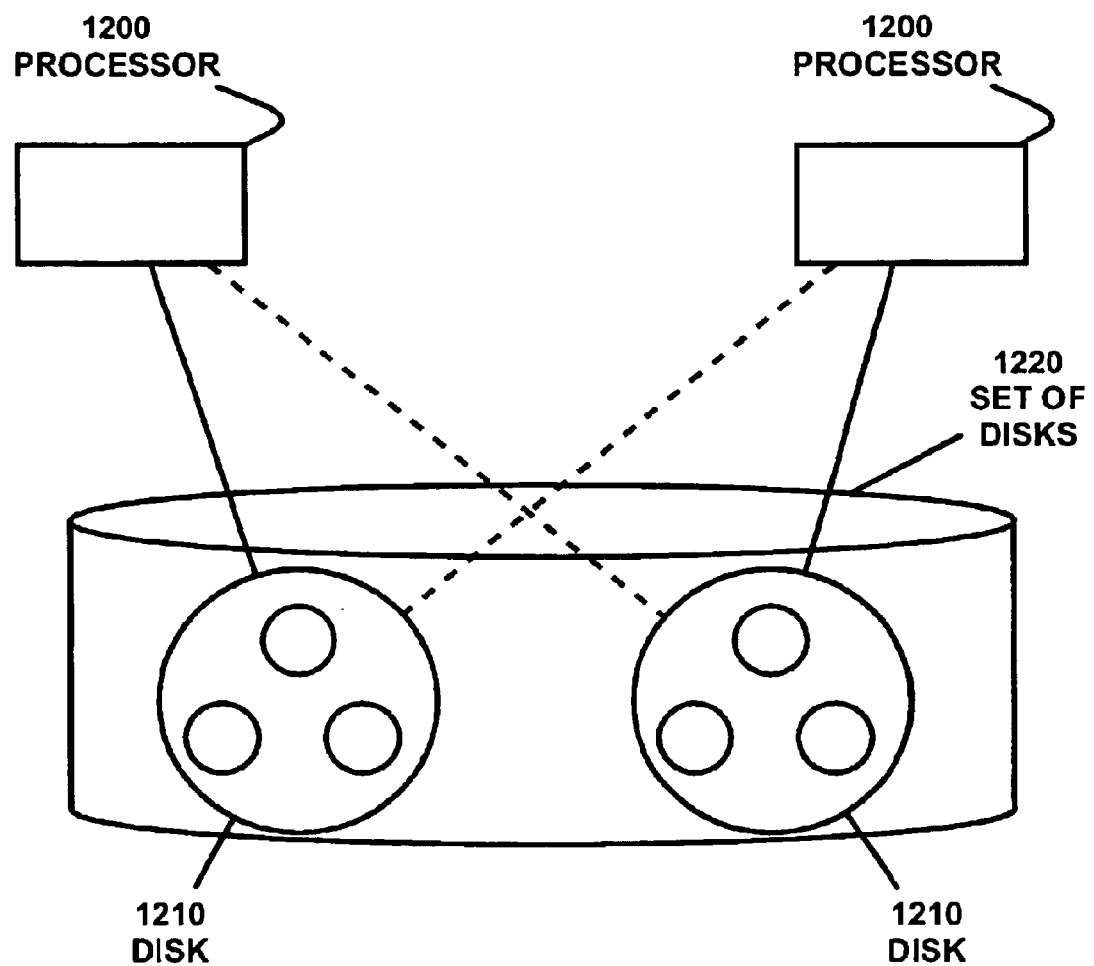
FIG. 12 shows a block diagram of a file system cluster including multiple concurrent active file systems being used by multiple concurrent file servers according to the invention.

FIG. 12 shows a block diagram of a file system cluster including multiple concurrent active file systems being used by multiple concurrent file servers according to the invention.

A file system cluster includes a plurality of file system processors 1200 and one or more file system disks 1210. In a preferred embodiment, each such processor 1200 is disposed for operating as a file server, capable of receiving file server requests and making file server responses, such as using a known file server protocol. In a preferred embodiment, the one or more file system disks 1210 include a plurality of such disks, so that no individual disk 1210 presents a single point of failure for the entire highly-available cluster. The Write Anywhere File system Layout (WAFL), which preferably is used with the invention, incorporates such an arrangement.

As discussed above, the plurality of processors 1200 can maintain multiple parallel writeable active file systems 1210, along with all associated snapshots for those parallel writeable active file systems. The active file systems and snapshots can be maintained on the same set of disks 1220. Thus, the set of processors 1200 and the set of disks 1220 can provide a highly available cluster without need for substantial duplication of resources.

Alternative Embodiments

The invention can be embodied in methods for creating and maintaining plural active file systems, as well as in software and/or hardware such as a storage device or devices that implement the methods, and in various other embodiments.

In the preceding description, a preferred embodiment of the invention is described with regard to preferred process steps and data structures. However, those skilled in the art would recognize, after perusal of this application, that embodiments of the invention may be implemented using one or more general purpose processors or special purpose processors adapted to particular process steps and data structures operating under program control, that such process steps and data structures can be embodied as information stored in or transmitted to and from memories (e.g., fixed memories such as DRAMs, SRAMs, hard disks, caches, etc., and removable memories such as floppy disks, CD-ROMs, data tapes, etc.) including instructions executable by such processors (e.g., object code that is directly executable, source code that is executable after compilation, code that is executable through interpretation, etc.), and that implementation of the preferred process steps and data structures described herein using such equipment would not require undue experimentation or further invention.

Furthermore, although preferred embodiments of the invention are disclosed herein, many variations are possible which remain within the content, scope and spirit of the invention, and these variations would become clear to those skilled in the art after perusal of this application.

What is claimed is:

1. A method of operating data storage, the method including maintenance of plural active file systems, wherein each of the active file systems initially access data shared with another of the active file systems, and wherein changes made to each of the active file systems are not reflected in the active file system with which the changed active file system shares the data.

2. A method as in claim 1, wherein when a second active file system is created based on a first active file system, the first active file system and the second active file system initially share data.

3. A method as in claim 2, wherein when changes are made to the first active file system, modified data is recorded in the first active file system in a location that is not shared with the second active file system.

4. A method as in claim 2, wherein when changes are made to the second active file system, modified data is recorded in the second active file system in a location that is not shared with the first active file system.

5. A method as in claim 1, wherein snapshots are made of ones of the plural active file systems, each snapshot forming an image of its respective active file system at a past consistency point.

6. A method as in claim 5, wherein each snapshot includes a complete hierarchy for file system data, separate and apart from active file system data for the plural active file systems.

7. A method as in claim 5, wherein at least one of the snapshots is converted into a new active file system.

8. A method as in claim 7, wherein the one of the snapshots is converted by making the one of the snapshots writable.

9. A method as in claim 8, wherein snapshot pointers from any of the active file systems to the new active file system are severed.

10. A method of creating plural active file systems, comprising the steps of:

making a snapshot of a first active file system, the snapshot initially sharing data with the first active file system; and converting the snapshot to a second active file system by making the snapshot writable, with changes made to the first active file system not reflected in the second active file system, and with changes made to the second active file system not reflected in the first active file system.

11. A method as in claim 10, wherein when changes are made to the first active file system, modified data is recorded in the first active file system in a location that is not shared with the second active file system.

12. A method as in claim 10, wherein when changes are made to the second active file system, modified data is recorded in the second active file system in a location that is not shared with the first active file system.

13. A method as in claim 10, further comprising the step of severing any snapshot pointers from the first active file system to the second active file system.

14. A method as in claim 10, further comprising the steps of making snapshots of ones of the plural active file systems.

15. A method as in claim 14, wherein each snapshot includes a complete hierarchy for file system data, separate and apart from active file system data for the plural active file systems.

16. A method as in claim 10, further comprising the steps of:

making anew snapshot of the first active file system, the new snapshot initially sharing data with the first active file system;

converting the new snapshot to a third active file system by making the new snapshot writable, with changes made to the first active file system or the second active file system not reflected in the third active file system.

17. A method as in claim 16, wherein when changes are made to the first active file system or the second active file system, modified data is recorded in a location that is not shared with the third active file system.

18. A method as in claim 10, further comprising the steps of:

making a new snapshot of the second active file system, the new snapshot initially sharing data with the second active file system;

converting the new snapshot to a third active file system by making the new snapshot writable, with changes made to the first active file system or the second active file system not reflected in the third active file system.

19. A method as in claim 18, wherein when changes are made to the first active file system or the second active file system, modified data is recorded in a location that is not shared with the third active file system.

20. A memory storing information including instructions, the instructions executable by a processor to operate data storage, the instructions comprising steps to maintain plural active file systems, wherein each of the active file systems initially access data shared with another of the active file systems, and wherein changes made to each of the active file systems are not reflected in the active file system with which the changed active file system shares the data.

21. A memory as in claim 20, wherein when a second active file system is created based on a first active file system, the first active file system and the second active file system initially share data.

22. A memory as in claim 21, wherein when changes are made to the first active file system, modified data is recorded in the first active file system in a location that is not shared with the second active file system.

23. A memory as in claim 21, wherein when changes are made to the second active file system, modified data is recorded in the second active file system in a location that is not shared with the first active file system.

24. A memory as in claim 20, wherein snapshots are made of ones of the plural active file systems, each snapshot forming an image of its respective active file system at a past consistency point.

25. A method as in claim 24, wherein each snapshot includes a complete hierarchy for file system data, separate and apart from active file system data for the plural active file systems.

26. A memory as in claim 24, wherein at least one of the snapshots is converted into a new active file system.

27. A memory as in claim 26, wherein the one of the snapshots is converted by making the one of the snapshots writable.

28. A memory as in claim 27, wherein snapshot pointers from any of the active file systems to the new active file system are severed.

29. A memory storing information including instructions, the instructions executable by a processor to create plural active file systems, the instructions comprising the steps of:
  making a snapshot of a first active file system, the snapshot initially sharing data with the first active file system; and
  converting the snapshot to a second active file system by making the snapshot writable, with changes made to the first active file system not reflected in the second active file system, and with changes made to the second active file system not reflected in the first active file system.

30. A memory as in claim 29, wherein when changes are made to the first active file system, modified data is recorded in the first active file system in a location that is not shared with the second active file system.

31. A memory as in claim 29, wherein when changes are made to the second active file system, modified data is recorded in the second active file system in a location that is not shared with the first active file system.

32. A memory as in claim 29, wherein the instructions further comprise the step of severing any snapshot pointers from the first active file system to the second active file system.

33. A memory as in claim 29, wherein the instructions further comprise the steps of making snapshots of ones of the plural active file systems.

34. A memory as in claim 33, wherein each snapshot includes a complete hierarchy for file system data, separate and apart from active file system data for the plural active file systems.

35. A memory as in claim 29, wherein the instructions further comprise the steps of:
  making a new snapshot of the first active file system, the new snapshot initially sharing data with the first active file system;
  converting the new snapshot to a third active file system by making the new snapshot writable, with changes made to the first active file system or the second active file system not reflected in the third active file system.

36. A memory as in claim 35, wherein when changes are made to the first active file system or the second active file system, modified data is recorded in a location that is not shared with the third active file system.

37. A memory as in claim 29, wherein the instructions further comprise the steps of:
  making a new snapshot of the second active file system, the new snapshot initially sharing data with the second active file system;
  converting the new snapshot to a third active file system by making the new snapshot writable, with changes made to the first active file system or the second active file system not reflected in the third active file system.

38. A memory as in claim 37, wherein when changes are made to the first active file system or the second active file system, modified data is recorded in a location that is not shared with the third active file system.

39. A storage system, comprising:
  at least one storage device;
  an interface to at least one computing device or network for receiving and sending information; and
  a controller that controls storage and retrieval of the information in the storage device, the controller operating under program control to maintain plural active file systems, wherein each of the active file systems initially access data shared with another of the active file systems, and wherein changes made to each of the active file systems are not reflected in the active file system with which the changed active file system shares the data.

40. A storage system as in claim 39, wherein when a second active file system is created based on a first active file system, the first active file system and the second active file system initially share data.

41. A storage system as in claim 40, wherein when changes are made to the first active file system, modified data is recorded in the first active file system in a location that is not shared with the second active file system.

42. A storage system as in claim 40, wherein when changes are made to the second active file system, modified data is recorded in the second active file system in a location that is not shared with the first active file system.

43. A storage system as in claim 39, wherein snapshots are made of ones of the plural active file systems, each snapshot forming an image of its respective active file system at a past consistency point.

44. A storage system as in claim 43, wherein each snapshot includes a complete hierarchy for file system data, separate and apart from active file system data for the plural active file systems.

45. A storage system as in claim 43, wherein at least one of the snapshots is converted into a new active file system.

46. A storage system as in claim 45, wherein the one of the snapshots is converted by making the one of the snapshots writable.

47. A storage system as in claim 46, wherein snapshot pointers from any of the active file systems to the new active file system are severed.

48. A storage system, comprising:
  at least one storage device;
  an interface to at least one computing device or network for receiving and sending information; and
  a controller that controls storage and retrieval of the information in the storage device, the controller operating under program control to create plural active file systems, the program control comprising the steps of:
  making a snapshot of a first active file system, the snapshot initially sharing data with the first active file system; and
  converting the snapshot to a second active file system by making the snapshot writable, with changes made to the first active file system not reflected in the second active file system, and with changes made to the second active file system not reflected in the first active file system.

49. A storage system as in claim 48, wherein when changes are made to the first active file system, modified data is recorded in the first active file system in a location that is not shared with the second active file system.

50. A storage system as in claim 48, wherein when changes are made to the second active file system, modified data is recorded in the second active file system in a location that is not shared with the first active file system.

51. A storage system as in claim 48, wherein the program control further comprises the step of severing any snapshot pointers from the first active file system to the second active file system.

52. A storage system as in claim 48, wherein the program control further comprises the steps of making snapshots of ones of the plural active file systems.

53. A storage system as in claim 52, wherein each snapshot includes a complete hierarchy for file system data, separate and apart from active file system data for the plural active file systems.

54. A storage system as in claim 48, wherein the program control further comprises the steps of:
making a new snapshot of the first active file system, the new snapshot initially sharing data with the first active file system;
converting the new snapshot to a third active file system by making the new snapshot writable, with changes made to the first active file system or the second active file system not reflected in the third active file system.

55. A storage system as in claim 54, wherein when changes are made to the first active file system or the second active file system, modified data is recorded in a location that is not shared with the third active file system.

56. A storage system as in claim 48, wherein the program control further comprises the steps of:
making a new snapshot of the second active file system, the new snapshot initially sharing data with the second active file system;
converting the new snapshot to a third active file system by making the new snapshot writable, with changes made to the first active file system or the second active file system not reflected in the third active file system.

57. A storage system as in claim 56, wherein when changes are made to the first active file system or the second active file system, modified data is recorded in a location that is not shared with the third active file system.

58. An apparatus for operating data storage, the apparatus including means for creating plural active file systems and means for maintaining plural active file systems, wherein each of the active file systems initially access data shared with another of the active file systems, and wherein changes made to each of the active file systems are not reflected in the active file system with which the changed active file system shares the data.

59. An apparatus for creating plural active file systems, comprising:
means for making a snapshot of a first active file system, the snapshot initially sharing data with the first active file system; and
means for converting the snapshot to a second active file system by making the snapshot writable, with changes made to the first active file system not reflected in the second active file system, and with changes made to the second active file system not reflected in the first active file system.

60. A method of operating data storage, comprising:
making a snapshot of organizational data of a first active file system, the snapshot pointing to original non-organizational data of the first active file system;
storing the snapshot;
modifying a first portion of the original non-organizational data of the first active file system in response to a first active file system access request, resulting in a modified first portion being part of first modified non-organizational data of the first active file system; and
storing the modified first portion so as not to overwrite the first portion;
wherein, after the step of storing the modified first portion, the snapshot points to the original non-organizational data, the organizational data of the first active file system point to the first modified non-organizational data of the first filing system, and the original non-organizational data and the first modified non-organizational data partially overlap.

61. A method according to claim 60, wherein: the step of storing the snapshot comprises storing the snapshot as a second active filing system; the method further comprising:
modifying a second portion of the original non-organizational data in response to a second active file system access request, resulting in a modified second portion being part of second modified non-organizational data of the second active file system; and
storing the modified second portion so as not to overwrite the second portion;
wherein, after the step of storing the modified second portion, the snapshot points to the second modified non-organizational data, the organizational data of the first active file system point to the first modified non-organizational data, and the first modified non-organizational data and the second modified non-organizational data partially overlap.

62. A method according to claim 61, wherein the step of making a snapshot is performed at a consistency point of the first active file system.

63. A method according to claim 62, wherein data is stored in the first and second active file systems using blocks.

* * * * *

(12) INTER PARTES REEXAMINATION CERTIFICATE (0389th)
United States Patent
Hitz et al.

(10) Number: US 6,857,001 C1
(45) Certificate Issued: Jun. 19, 2012

(54) MULTIPLE CONCURRENT ACTIVE FILE SYSTEMS

(75) Inventors: David Hitz, Los Altos, CA (US); John Edwards, Sunnyvale, CA (US); Blake Lewis, Los Altos Hills, CA (US)

(73) Assignee: Netapp, Inc., Sunnyvale, CA (US)

Reexamination Request:
No. 95/000,324, Feb. 8, 2008

Reexamination Certificate for:
Patent No.: 6,857,001
Issued: Feb. 15, 2005
Appl. No.: 10/165,188
Filed: Jun. 7, 2002

(51) Int. Cl.
*G06F 17/30* (2006.01)

(52) U.S. Cl. ............................. 707/822; 707/999.008; 707/999.1; 707/999.201; 707/999.202; 707/E17.01; 707/999.001

(58) Field of Classification Search ................ None
See application file for complete search history.

(56) References Cited

To view the complete listing of prior art documents cited during the proceeding for Reexamination Control Number 95/000,324, please refer to the USPTO's public Patent Application Information Retrieval (PAIR) system under the Display References tab.

*Primary Examiner* — James Menefee

(57) ABSTRACT

Maintenance of plural active file systems, wherein each of the active file systems initially access data shared with another of the active file systems, and wherein changes made to each of the active file systems are not reflected in other active file systems. When a second active file system is created based on a first active file system, the first active file system and the second active file system initially share data. When changes are made to the first active file system, modified data is recorded in the first active file system in a location that is not shared with the second active file system. When changes are made to the second active file system, modified data is recorded in the second active file system in a location that is not shared with the first active file system. Also, creation of the plural active file systems.

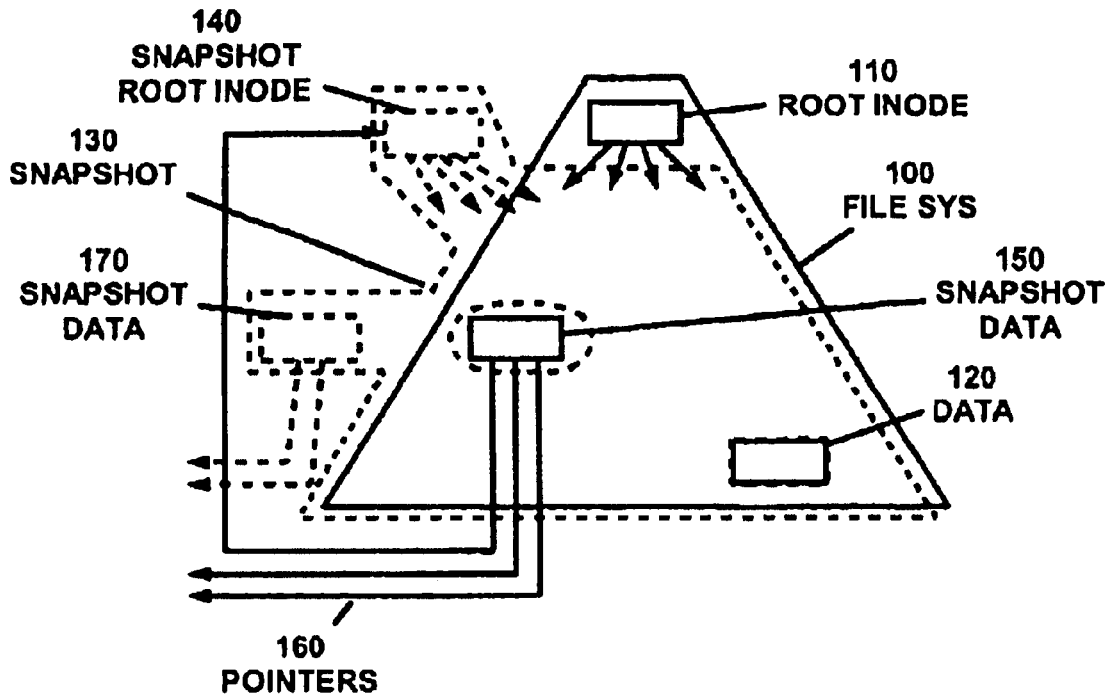

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-63 are cancelled.

* * * * *